Figure 1:
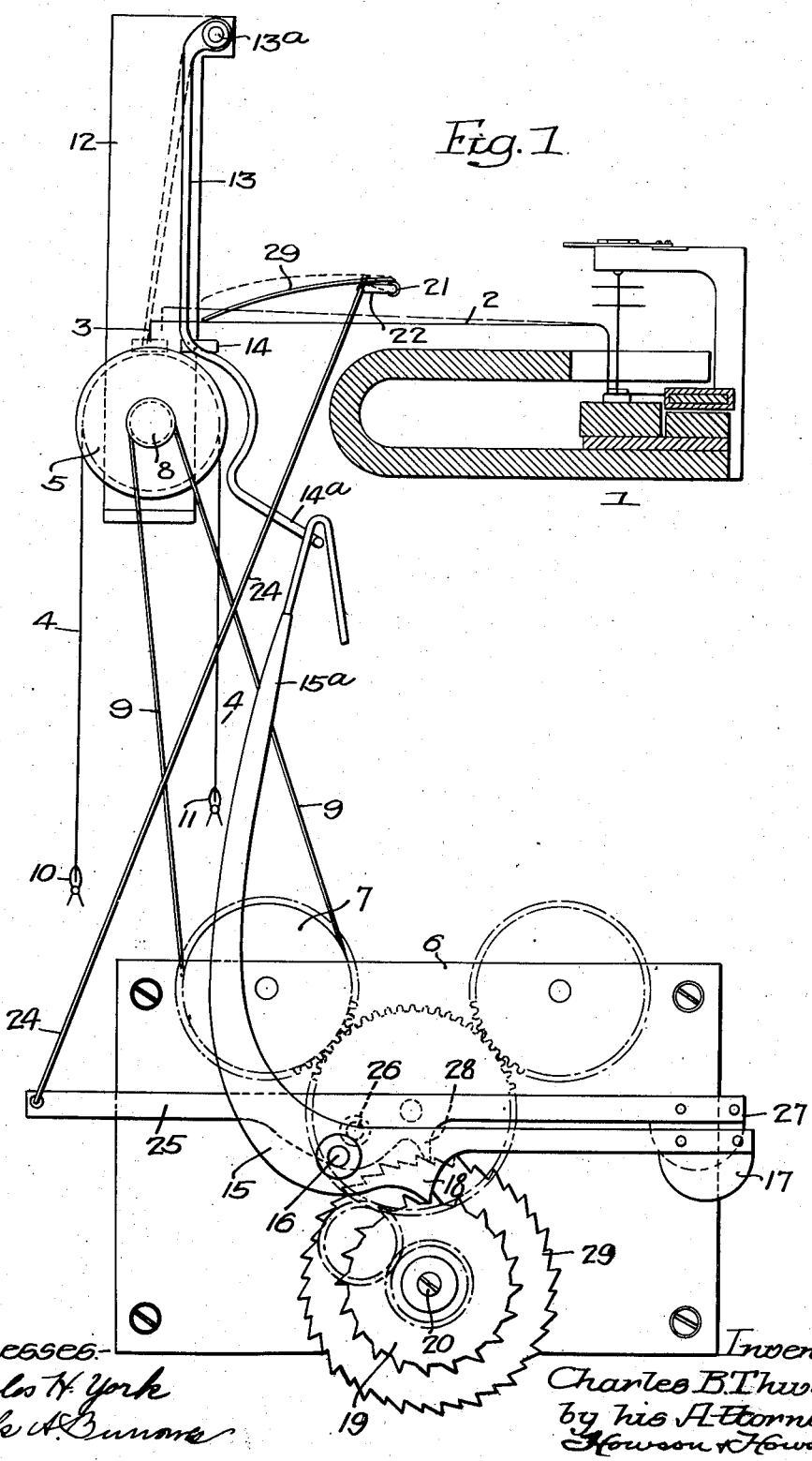

C. B. THWING.
GRAPHIC RECORDER.
APPLICATION FILED MAR. 21, 1913.

1,119,665.

Patented Dec. 1, 1914.
2 SHEETS—SHEET 1.

Witnesses
Charles H. York
Willis A. Dunmore

Inventor
Charles B. Thwing
by his Attorneys
Howson & Howson

C. B. THWING.
GRAPHIC RECORDER.
APPLICATION FILED MAR. 21, 1913.
1,119,665.
Patented Dec. 1, 1914.
2 SHEETS—SHEET 2.
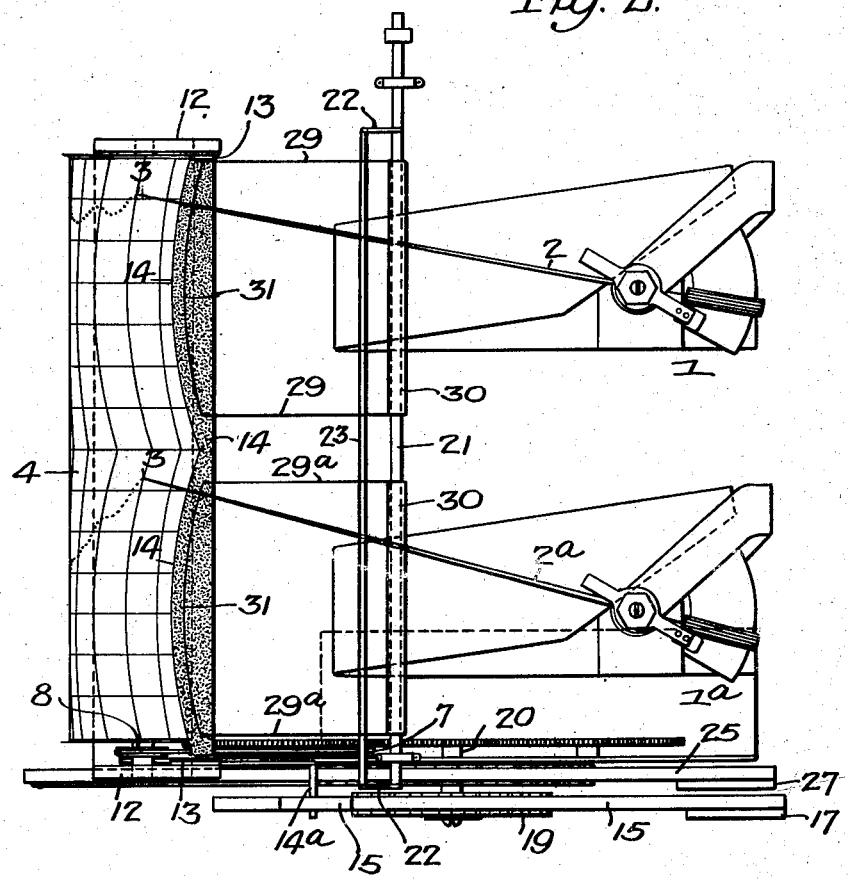
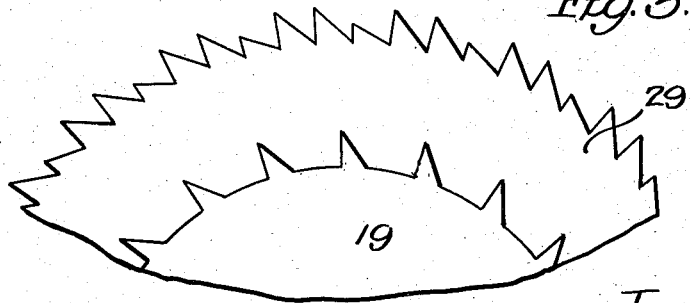

UNITED STATES PATENT OFFICE.

CHARLES B. THWING, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA.

GRAPHIC RECORDER.

1,119,665.  Specification of Letters Patent.  Patented Dec. 1, 1914.

Application filed March 21, 1913. Serial No. 755,943.

*To all whom it may concern:*

Be it known that I, CHARLES B. THWING, a citizen of the United States, residing in Philadelphia, Pennsylvania, have invented certain Improvements in Graphic Recorders, of which the following is a specification.

My invention relates to certain improvements in that class of devices known as graphic recorders, and has to do more particularly with recorders of the type described and claimed in U. S. patents granted to me, Nos. 921,606, dated June 1, 1909, and 1,046,680, dated December 10, 1912.

One object of the present invention is to facilitate the application of ink to the pen of the recorder, as well as to make more certain the engagement with, or the operative positioning of a plurality of pens relatively to a chart, when several pens are actuated by a single depressor mechanism.

A further object of the invention is to provide a graphic recorder having the above noted characteristics, which shall be relatively substantial and inexpensive, as well as reliable under operating conditions.

These objects and other advantageous ends I secure as hereinafter set forth, reference being had to the accompanying drawings, in which;

Figure 1, is a side elevation, partly in section, illustrating a graphic recorder constructed according to my invention; Fig. 2, is a plan of the mechanism illustrated in Fig. 1, and, Fig. 3 is a fragmentary elevation of a slightly modified detail.

As will be understood by those skilled in the art, the essential features of an instrument designed to provide a graphic record of the variations of any measured quantity with the time, consist of a registering element and a surface receiving the record made by said element; the latter moving in a given direction with the time, while the former remains in operative relation with the recording surface either constantly, or in cases where the energy is relatively small, is brought into contact with said surface at intervals.

In the following description, the recording element will hereafter be referred to as the pen, and the receiving element which coöperates therewith, the chart.

Referring to the above drawings, 1 and 1ª represent galvanometers or other instruments having movable indicating members consisting in the present instance of oscillatory needles 2 and 2ª in the form of relatively elongated wires provided with chart-engaging points or portions 3 and constituting the pens. Said pens are so supported that in addition to being free to oscillate in a plane under the action of the galvanometers of which they form parts, their outer or free ends may be caused to move in planes or lines substantially at right angles to said first-named plane, by mechanism hereinafter described, being sufficiently elastic or supported in such manner as to return to positions in the first plane after being moved out of the same.

The chart in the present instance is provided by an elongated sheet or web 4 of paper, passing over a substantially horizontal roller 5, which is driven at a predetermined suitable speed from a clock 6; the connection between these members being provided by pulley wheels 7 and 8, of which the first is driven from the clock mechanism, and the second is fixed to the spindle of the roller 5. A belt 9 connects said two pulleys, and the chart 4 on the roller 5 is maintained in a taut condition and is caused to frictionally connect with the roller by any desired means, such as a pair of weights 10 and 11, respectively fixed to its ends.

For periodically applying ink to the portions 3 of the pens 2 and 2ª, I provide a supporting frame 12, to the upper part of which is pivoted a pair of downwardly extending arms 13 carrying and connected by any suitable form of ink pad 14, which in the present instance extends substantially parallel with a line of the surface of the roll 5 and immediately adjacent the top thereof. The pad in the present instance consists of an elongated relatively shallow container of substantially the length of the roll 5, carrying a body of absorbent material saturated with ink or any other fluid which it is desired shall be applied by the pens to the chart to form the graphic record.

One of the arms 13 has an extension 14ª below and to one side of the roll 5 designed for co-action with an elongated arm of a lever 15 pivoted at 16 to any desired structure, such as the frame of the clock 6, and having an arm carrying a counterweight 17. The portion of the lever between the pivot 16 and the weight 17 includes a downwardly extending tooth 18 designed to coöperate with the teeth of a ratchet wheel 19 driven at a predetermined speed by the mechanism of the clock 6; the arrangement of parts being such that as this ratchet wheel is turned, the lever 15 is moved on its pivot so that its upwardly extending arm 15$^a$ through the extension 14$^a$ swings the arms 13 on their pivots 13$^a$, thus alternately moving the ink pad 14 to a position immediately over the topmost part of the chart 4 and the roller 5, directly under the portions 3 of the pens 2 and 2$^a$, and thereafter permitting said pad to swing away from the chart and roller so as to allow of said portions 3 being moved into engagement with said chart to make records thereon.

Supported in any suitable manner above the pens 2 and 2$^a$ is a spindle 21 extending in a line substantially parallel with the axis of the roll 5 and having loosely mounted on it, adjacent its ends, projecting arms 22 which are connected by a bar 23 constituting a primary pen depressor. One of said arms is connected through a link 24 with one end of a second lever 25 pivoted at 26 to any suitable supporting structure such as the frame of the clock 6 and at its opposite end is provided with a counter-weight 27. This lever 25 has a downwardly projecting tooth 28 designed to coöperate with the teeth of a ratchet wheel fixed on the spindle 20, which as before noted, also carries the toothed wheel 19. The second ratchet wheel, however, is peculiar in that its alternate teeth are only about two-thirds as high as the remainder, with the result that as said wheel is turned, the lever 25 is first caused to move the link 24 through a predetermined distance and is thereafter caused to move it through a greater distance. As a consequence the primary depressor 23 is allowed to swing downwardly from its normal position through a short arc and after being rather suddenly lifted, is again allowed to swing downwardly through a longer arc, being thereafter again suddenly returned to its raised position.

The spindle 21 serves to loosely support a plurality of secondary depressor arms 29, each of which includes a sleeve 30 loosely mounted on said spindle and having fixed to its ends, two parallel arms connected by a cross member 31 of such length and so placed above the ends of the pens 2 and 2$^a$ that when it is allowed to descend under the action of gravity, it engages the particular pen immediately under it, forcing the portion 3 thereof into engagement with the chart.

From Fig. 1 it will be noted that the primary depressor extends immediately under both of the secondary depressors 29 and 29$^a$ and the arrangement is such that when it is raised under the action of the lever 25, it carries with it both of the secondary depressors 29 and 29$^a$, while when it is lowered, it permits said secondary depressors to descend under the action of gravity, causing their portions 31 to force their respective pens into engagement with the chart 4.

In the particular case illustrated, the galvanometers 1 and 1$^a$ are millivoltmeters connected in circuit with thermocouples so that the pens oscillate in accordance with variations in the temperatures to which said couples are exposed. The clock 6 being wound, turns the spindle 20 with the ratchet wheels 19 and 29, and drives the pulley wheel 7, causing the chart 8 to move at a predetermined speed by the revolution of the roller 5.

As the ratchet wheel 19 is turned in the direction of the arrow Fig. 1, one of its teeth engages the tooth 18 of the lever 15, swinging this latter on its pivot or fulcrum 16 and through the arm 15$^a$ and the extension 14$^a$, also swinging the ink pad 14 into the position indicated in dotted lines in Fig. 1, immediately under the portions 3 of the two pens, it being understood that the wheel 19 is so fixed on the spindle 20 relatively to the ratchet wheel 29 that the tooth 28 of the lever 25 is at its lowest position ready to ride upon one of the higher teeth, with the primary depressor 23 and both of the secondary depressors in their raised positions, just before the tooth 18 falls from the highest part of one of the teeth of the ratchet wheel 19. The portions 3 of the two pens are thus elevated so that the ink pad 14 is free to assume the above noted position, and immediately after so doing, the tooth 28 is raised by engagement with one of the shorter teeth of the ratchet wheel 29. The primary depressor is thus lowered, thereby permitting both of the secondary depressors to descend into engagement with their respective pens 2 and 2$^a$ and forcing their portions 3 into engagement with the ink pad in the container 14. Sufficient ink is thus applied to the pens to make one or more marks on the chart.

It is to be noted that the angular arc occupied by two adjacent teeth of the ratchet wheel 29 is substantially equal to the angular arc occupied by one of the teeth of the ratchet wheel 19, so that while the ink pad 14 still occupies its operative position by reason of the relatively slow movement of the lever 15, the tooth 28 falls off of the short tooth of the ratchet wheel 29, causing the primary depressor 23 to raise both of the secondary depressors, which as above noted, have been allowed to independently depress their respective pens onto the ink pad. Thereafter the tooth 18, under the action of the counter-weight 17, falls off of the tooth of the ratchet 19 which has hitherto kept it elevated, thus quickly moving the ink pad or allowing it to move, into its inoperative position shown in full lines in Fig. 1.

The tooth 28 of the lever 25 is gradually elevated by engagement with one of the high teeth of the ratchet wheel 29 so that after the ink pad has been with-drawn, the primary depressor 23 is allowed to descend, thus also permitting the secondary depressors to come into engagement with their respective pens. The previously inked recording portions 3 of these latter are thus forced downwardly a sufficient distance to bring them into engagement with the chart 4, making certain marks thereon depending upon the positions of the pens. Obviously the length of time of this engagement between the pens and the chart may be varied to secure any desired form of dot or dash record, by varying the design of the teeth of the ratchets 19 and 29, or as shown in Fig. 3 by inserting more than one high tooth between each two short teeth. In this latter case each pen is caused to twice come into engagement with the chart between each inking, though in any event this depression of the several pens causes a graphic record to be made by each of them upon the chart 4, which as before noted, is moved at any desired speed by the clock mechanism through the medium of the pulley wheels 7 and 5 and the belt 9. Thereafter the tooth 28 of the lever 25 falls off of the high tooth of the ratchet 29, thus quickly swinging upward the primary depressor 23, which in turn raises the secondary depressors 29 and 29ª. The two pens 2 and 2ª are so supported and constructed that their recording portions 3 rise high enough to be out of engagement with the chart, and occupy positions such that the ink pad 14 may be swung under them when another tooth of the ratchet 19 engages the tooth 18 of the lever 15.

I am thus enabled to allow the circuits of the galvanometers 1 and 1ª to remain continuously closed, so that the respective pens of these instruments are always in positions determined by the quantities of energy being measured at any particular moment. Moreover, the ink pad is alternately moved into a position such that all of the pens may be brought into engagement with it and is then so moved as to permit said pens coming into engagement with the chart one or any number of times to form graphic records thereon as may be desired.

It is of course obvious that any desired number of galvanometers or other instruments capable of actuating recording pens may be employed without departing from my invention, especially since by reason of the novel construction above described, there is no possibility of the pens failing to be brought into engagement with the chart at the desired time by reason of their varying elasticity or of their unequal heights above said chart. In any case, each pen has its own secondary depressor, and all of the secondary depressors are controlled by a primary depressor, so that each pen is depressed to coöperate with the chart independently of all of the others. In the intervals while the depressors are not in operation, the pens are obviously free to assume positions corresponding to the quantities of current or other actuating force operative on the galvanometers or other instruments from which they are actuated, so that each time said depressors descend, the chart receives records in exact correspondence with the current, etc., at the time such records are made.

I claim:—

1. The combination in a graphic recorder of a chart supporting structure; a pen normally out of engagement with a chart on said structure; an ink carrier; means for periodically interposing said carrier between the pen and the chart, and means for actuating the pen to form a record, the same consisting of a primary depressor; means for actuating said depressor; with a secondary depressor controlled by the primary depressor and operative on the pen.

2. The combination in a graphic recorder of a chart supporting structure; a pen for forming a record on a chart carried by the structure; an ink carrier; means for periodically interposing said carrier between the pen and the chart, a gravity-actuated secondary depressor for moving the pen into operative position; and a primary depressor for periodically moving the secondary depressor.

3. The combination in a graphic recorder of a chart supporting structure; a plurality of pens independently mounted to form records on a chart carried by said structure; and means for actuating said pens consisting of a series of independent secondary depressors respectively operative on the pens; with a primary depressor for controlling the operation of all of the secondary depressors.

4. The combination in a graphic recorder of a chart supporting structure; a plurality of pens independently mounted to form records on a chart carried by said structure; a series of independent, gravity-actuated depressors mounted to respectively depress the pens; a primary depressor controlling the operation of all of the secondary depressors; and mechanism for periodically actuating said primary depressor.

5. The combination in a graphic recorder of a chart supporting structure; a plurality of pens mounted to form records on a chart carried by said structure; an inking device for said pens; independent secondary depressors for respectively actuating the pens; a primary depressor for controlling the secondary depressors; and mechanism for periodically moving the inking device into position to supply ink to the pens when they are depressed under predetermined conditions.

6. The combination in a graphic recorder of a chart supporting structure; a plurality of instrument-actuated pens mounted to form records on a chart carried by said structure; and means for causing the pens to form records on a chart carried by said structure, the same consisting of a series of arms; bars respectively carried by said arms and respectively extending over the pens to form secondary depressors; a primary depressor in the form of a bar extending adjacent all of said arms; and means for periodically moving said bar to cause it to simultaneously move all of the secondary depressors.

In testimony whereof, I have signed my name to this specification, in the presence of two subscribing witnesses.

CHARLES B. THWING

Witnesses:
WILLIAM E. BRADLEY,
JOS. H. KLEIN.